May 7, 1957  H. L. BIEN  2,791,134
METHOD OF MAKING CUTTING DIES
Filed Nov. 28, 1955

INVENTOR.
Howard L. Bien by *[signature]*

ATTORNEY

United States Patent Office 2,791,134
Patented May 7, 1957

2,791,134

METHOD OF MAKING CUTTING DIES

Howard L. Bien, Flushing, N. Y.

Application November 28, 1955, Serial No. 549,315

4 Claims. (Cl. 76—107)

The present invention relates to a method of making cutting dies to be used in working on sheet material and is designed particularly for production of a limited number of punchings of irregular outline.

A method of making a device for punching sheet metal has been proposed before which consists in cutting an opening in a die block having the contour of the desired punching, then bending blade means in strip form to make cutting edges and fitting them around the inside of the opening in the die block, pressing a smaller block of the same contour into the space enclosed by the blades, fastening a punch plate to a base plate, pressing the cutting edges of the blades into the punch plate to mark off the desired contour thereon, removing the marked punch plate from the base plate, trimming the punch plate to the marked outline of the contour, and finally returning and fastening the trimmed punch plate to the base plate. While this known method brought about an improvement over the conventional die making process, particularly for the use of a limited number of punchings, the results were not satisfactory in many instances, because this known method could provide for the thickness of the sheet metal to be worked by trial and error only and, therefore, created difficulties in the punching of the sheet metal.

It is, therefore, one object of the present invention to provide a method of die making in which the size of the punch as well as that of the cutting blades is dimensioned in such manner that it may be varied in accordance with the thickness of the sheet material to be worked.

It is another object of the present invention to provide a method of making cutting dies which permits the manufacture of a die at extremely low cost without jeopardizing the precision necessarily required in the making of a die.

With these and other objects in view which will become apparent in the following detailed description, the present invention will be clearly understood in connection with the accompanying drawings, in which.

Figure 1:
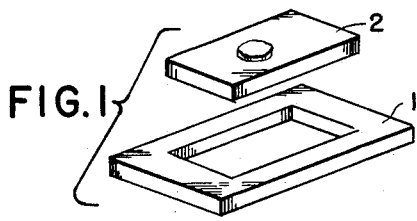
Figure 1 is a perspective exploded view of a wood block and its complementary centerpiece.
Figure 2:
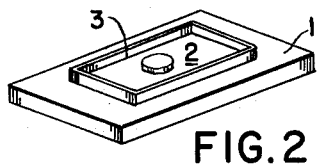
Fig. 2 is a top perspective view of the wood block, the centerpiece being reinserted together with blade means.
Figure 4:
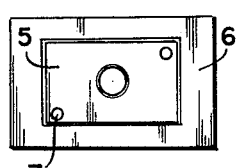
Fig. 4 is a top plan view of the unit shown in Fig. 3 after forming the moulded punch member therein.
Figure 3:
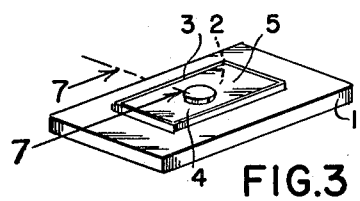
Fig. 3 is a top perspective view of the wood block with its centerpiece and the blade means therebetween, and the punch moulded therein.

Referring now to the drawings, it will be apparent that the present method operates in such manner that at first the die is produced in accordance with the configuration and the required internal shapes of the body to be worked from sheet material and then the die is used for producing the punch member.

In order to produce the die a wood block 1 is provided on which the outline of the shape to be punched out of the sheet material is marked. A centerpiece 2 is then cut out from the wood block 1 along the marked lines and removed from the wood block 1. Blade means 3 are fitted to the side faces of the centerpiece 2 whereupon the centerpiece 2 is inserted into the wood block 1 together with the blade means 3, which blade means may comprise steel rule blades. In order to bring about a good fit of the blade means 3 between the centerpiece 2 and the wood block 1 it is preferable to use a saw (not shown) for cutting out the centerpiece 2 which has a thickness equivalent to that of the blade means 3.

Upon reassembling the centerpiece 2 with the blade means 3 into the wood block 1, the blade means 3 project above the top face of the wood block 1 and the centerpiece 2, respectively, and in this stage this assembled unit which constitutes the die for the punch process is used to produce the complementary punch member. This is brought about by pouring a suitable material which may be an alloy, a plastic or any other material having characteristics which make it suitable for the present purpose on top of the centerpiece, the blade means 3, and in case of internal shapes, punches inserted therein constituting the lateral limitations during the pouring of the material. The internal shapes thus formed in the mould may be used as drill jigs for transforming said shapes to a steel plate, referred to later.

In order to obtain a punch member of a proper size, that means which is smaller than the die and takes into consideration the thickness of the sheet material to be worked, before the pouring step takes place, a spacing layer 4 of wax or similar material, or a layer of sheet material of metal, plastic or the like is disposed inside of the blade means 3. The thickness of the layer 4 will vary and will be in direct relation with the thickness of the sheet material to be worked, so that by using a layer 4 of predetermined thickness a punch member may be obtained which is precisely made to the size required for working the sheet material of certain thickness. Wax or plastic is preferred for the spacing layer, because it simplifies the removal of the hardened moulded body.

Figure 5:
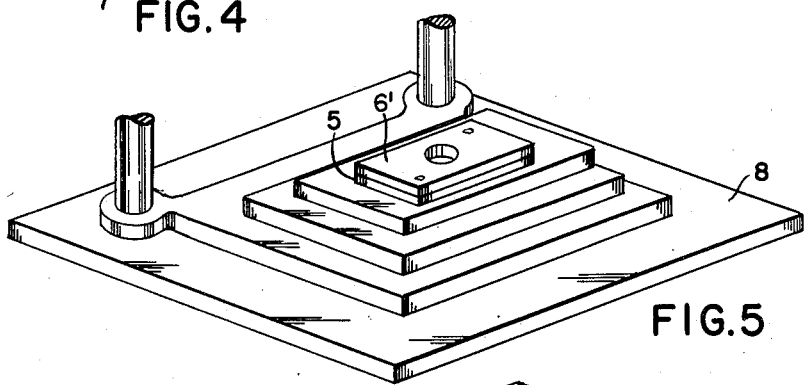
Fig. 5 is a top perspective view of the bottom die set of the press.
Figure 6:
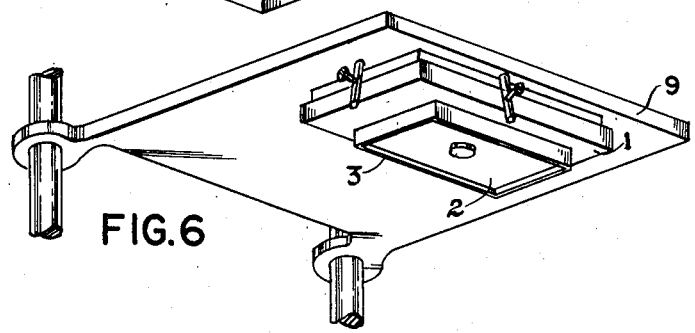
Fig. 6 is a bottom perspective view of the upper die set of the press.
Figure 7:
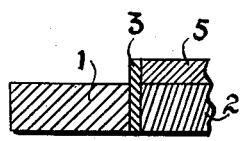
Fig. 7 is a fragmentary section along the lines 7—7 of Fig. 3.

Upon hardening of the poured material a mould has been formed conforming to the shape of the die, yet of slightly smaller dimensions in accordance with the requirements for the punch member. The hardened mould 5 may then be used by itself as a punch member, provided is is made of material which is sufficiently rigid and hard to sustain the wear of a reasonably low number of punching operations. In some instances it will be required, however, to mount the formed mould 5 on a steel plate 6 and secure the mould 5 on the steel plate 6 by screws 7 or other suitable means. The steel plate 6 is then cut to the size of the formed mould 5 and is then mounted preferably on the lower die set 8 of the press together with the mould 5 or it is also possible to remove the mould 5 from the previously shaped steel punch member 6' (Fig. 5) which was worked out from the steel plate 6 and use the punch member 6' without the mould 5.

The die consisting of the wood block 1, centerpiece 2 and the blade means 3 is then mounted in reverse position on the upper die set 9 of the press in proper position relative to the punch member 6' of the lower die set 8 and the die and punch member is ready for performing an appreciable number of punch operations.

While I have disclosed one embodiment of the present invention, it is to be understood that this embodiment is given by example only and not in a limiting sense, the scope of the present invention being determined by the objects and the claims.

I claim:

1. A method of making a device for punching sheet material comprising the steps of cutting out of a block, a centerpiece having the inner and outer contour of the article to be punched out of sheet material, fitting blade means around said centerpiece and reassembling said centerpiece in said block with said blade means projecting from said block and clamped therebetween, applying a layer of spacing material of a thickness complementary to the thickness of the sheet material to be worked on the inside of the projecting portion of said blade means, pouring material in its liquid state into the space defined by the top face of said centerpiece and said layers of spacing material to form a punch member of a contour complementary to said centerpiece, the difference in size between said punch member and said centerpiece being determined by the thickness of the sheet material to be punched, and said punch member and said clamped blade means being adapted to be mounted on oppositely disposed supporting members.

2. The method, as set forth in claim 1, which includes the step of mounting said moulded material on a steel plate and trimming said steel plate to the outline of the contour of said mould, and mounting at least said trimmed steel plate on the lower die set of said press.

3. A method of making a device for punching sheet material comprising the steps of cutting out of a block, a centerpiece having the inner and outer contour of the article to be punched out of sheet material, fitting blade means around said centerpiece and reassembling said centerpiece in said block with said blade means projecting from said block and clamped therebetween, pouring material in its liquid state into the space defined by the top side of said centerpiece and the projecting portion of said blade means to form a punch member of a contour complementary to said centerpiece, the difference in size between said punch member and said centerpiece being determined by the thickness of the sheet material to be punched, and said punch member and said clamped blade means being adapted to be mounted on oppositely disposed supporting members.

4. The method, as set forth in claim 3, which includes the step of cooling said moulded material forming said punch member.

References Cited in the file of this patent
UNITED STATES PATENTS 1,701,545     Shaw _____ Feb. 12, 1929